United States Patent [19]
Callahan et al.

[11] Patent Number: 5,959,678
[45] Date of Patent: Sep. 28, 1999

[54] ULTRASOUND IMAGE MANAGEMENT SYSTEM

[75] Inventors: Terrance Callahan, Aurora; Desmond Hirson, Thornhill, both of Canada

[73] Assignee: Dicomit Imaging Systems Corp., Richmond Hill, Canada

[21] Appl. No.: 08/547,266

[22] Filed: Oct. 24, 1995

[51] Int. Cl.[6] .............................. H04N 7/01; H04N 7/10
[52] U.S. Cl. ...................... 348/442; 600/443; 600/437; 345/327; 709/217
[58] Field of Search ...................... 348/442, 163, 348/553, 6, 12, 13, 552, 327; 600/437, 443; 128/660.04, 660.01, 660.07; 364/413.01, 413.19; 395/200.47

[56] References Cited

U.S. PATENT DOCUMENTS

| | | | |
|---|---|---|---|
| 5,322,066 | 6/1994 | Miyataka et al. | 128/660.04 |
| 5,469,353 | 11/1995 | Pinsky et al. | 364/413.01 |
| 5,528,302 | 6/1996 | Basoglu et al. | 348/442 |
| 5,586,160 | 12/1996 | Mascio | 378/37 |

OTHER PUBLICATIONS

Product Brochure for Access Acquisition Module and Image Management System by Advanced Technology Laboratories Undated.

*Primary Examiner*—Victor R. Kostak
*Attorney, Agent, or Firm*—Ridout & Maybee

[57] ABSTRACT

An image management system for use in conjunction with an ultrasound machine. The system comprises an input port coupled to the ultrasound machine for receiving the video output signal generated for the ultrasound images and a frame buffer for digitizing and storing the video output from the ultrasound. The system includes a switch for routing the video output signal or the video signal generated from the digitized ultrasound images to the monitor of the ultrasound for display. The system allows the original video signal to be displayed without introducing artifacts. The system includes storage devices for archive and retrieval of the digitized ultrasound images and playback on the ultrasound monitor. The system also includes a communication port for interfacing the ultrasound with a PACS or a networked ultrasound management system.

16 Claims, 4 Drawing Sheets

ULTRASOUND IMAGE MANAGEMENT SYSTEM

FIELD OF THE INVENTION

The present invention relates to image management systems, and more particularly to an image manager for use with an ultrasonic imaging station.

BACKGROUND OF THE INVENTION

Ultrasound imaging machines are a mainstay of modern medical practice. Ultrasound machines utilize ultrasonic waves, i.e. sonar, to scan a patient's body. The ultrasound machine produces images which are viewed by doctors in the diagnosis and care of patients. Ultrasound is particularly useful for viewing a foetus during prenatal care in a pregnancy. Ultrasound is also used to view blood-flow patterns in arteries.

In larger hospitals, the ultrasound machines are networked with a Picture Archive and Communications System ACS). The PACS provides a central library for storing and retrieving ultrasound images. Typically, a hospital will have one PACS connected to several ultrasound stations spread throughout the hospital or at remote locations connected by a communication network. The images generated by the ultrasound stations are transferred to the PACS for storage and later retrieval and review. Because of the cost, PACS are mostly found in the larger metropolitan hospitals.

Although their use is widespread, ultrasound machines are expensive to purchase and the number of ultrasound machines in a hospital is limited. Larger hospitals are typically equipped with several ultrasound machines, while smaller hospitals are limited to one or two machines. With decreasing budgets hospitals are reluctant to upgrade or replace their ultrasound equipment and many hospitals continue to operate with older equipment. This means that many existing ultrasound machines in use are not compatible with the newer picture format standards, such as DICOM3 or DEFF. Because most newer PACS are based on DICOM3 or DEFF standards, this means that the older ultrasound machines currently in use are also incompatible and cannot be integrated into a networked ultrasound management system, e.g. several ultrasound machines networked with a PACS. For a smaller hospital having one or two ultrasound machines it is impractical to support a PACS, however, the additional functionality provided by PACS is still desirable.

Accordingly, there is a need for image management system for use in conjunction with an ultrasound machine which provides the ultrasound machine with DICOM3 and DEFF compatibility. There is a need for an image management system providing the capability to interface with a PACS utilizing DICOM3 or DEFF standards. There is also a need for an image management system which provides an ultrasound machine with a local archive and retrieve facility.

BRIEF SUMMARY OF THE INVENTION

The present invention provides an image management system which allows conventional ultrasound machines to be upgraded to advanced picture formats, such as DICOM3 or DEFF compatibility.

The image manager according to the present invention features a communication interface to connect the ultrasound to a PACS or a networked ultrasound management system. The image manager also provides an ultrasound machine with micro-PACS capability for local archive and retrieval of ultrasound images. The capability to store images independently of a Review station eliminates downtime when the networked system is down.

The image manager according to the present invention gives a user the capability to display a live or frozen image generated by the ultrasound machine or captured images stored locally by the image manager. This allows the ultrasound monitor to be used for displaying both the ultrasound image and the captured ultrasound images.

Another feature of the image management system according to the present invention is the ability to operate in a loop-back mode without affecting the quality of the original video output signal generated by the ultrasound machine. Because the interpretation of ultrasound images depends to a large degree on the skill of an operator, the subtle features and textures of images generated by the ultrasound become important to the operator, especially an operator who has trained on a particular ultrasound machine. Therefore, it is undesirable to introduce artifacts, for example due to digitization or analog conversion, into the video input signal being displayed on the ultrasound monitor, and accordingly, in loop-back mode, the image manager passes the video output signal directly to the ultrasound monitor.

The image manager includes impedance matching to maintain termination integrity for the ultrasound display monitor and thereby minimize the detrimental effects of noise on image quality.

In a first aspect, the present invention provides an image management system for use in conjunction with an ultrasound machine having a scan converter for converting ultrasonic scan data into a video output signal and a monitor having an input for receiving a video input signal for display. The image management system comprises: (a) an input port coupled to the ultrasound machine for receiving the video output signal; (b) a switch for routing a signal to the monitor, the switch having a switch output coupled to the input of the monitor and a first switch input coupled to the input port for receiving the video output signal from the ultrasound machine and a second switch input for receiving another video output signal; and (c) a controller coupled to the switch for selectively switching the video output signal and the other video output signal to the switch output for displaying the selected video signal on the monitor.

In a second aspect, the present invention provides an image management system for use in conjunction with an ultrasound machine having a scan converter for converting ultrasonic scan data into a video output signal and a monitor having an input for receiving a video input signal for display. The image management system comprises: (a) an input port coupled to the ultrasound machine for receiving the video output signal; (b) a switch for routing a signal for display on the monitor, the switch having a switch output coupled to the input of the monitor and a first switch input coupled to the input port for receiving the video output signal from the ultrasound machine and a second switch input for receiving another video output signal; (c) a controller coupled to the switch for selectively switching the video output signal and the other video output signal to the switch output for displaying the selected video signal on the monitor; (d) a frame buffer having an input for receiving the video output signal and having an image processor for processing the video output signal and generating a video output signal at an output coupled to the second switch input; (e) the image processor having means for generating digital image files corresponding to the video output signal; and (f) a storage device for storing and retrieving the digital image files.

BRIEF DESCRIPTION OF THE DRAWINGS

Reference will now be made, by way of example, to the accompanying drawings which show a preferred embodiment of the present invention, and in which.

DETAILED DESCRIPTION OF THE PREFERRED EMBODIMENTS

Figure 1:
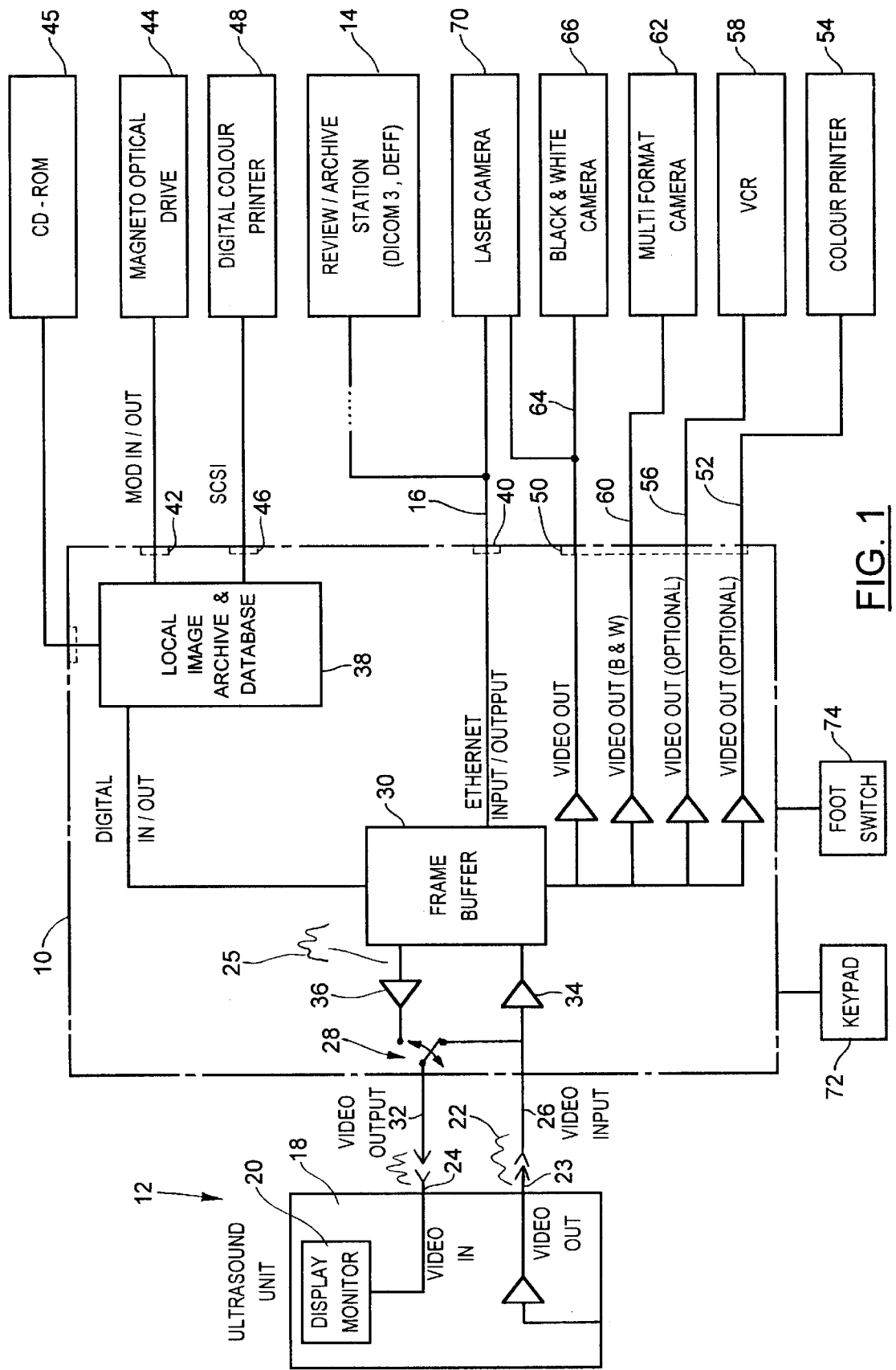
FIG. 1 is a block diagram showing an image management system according to the present invention.

Reference is first made to FIG. 1 which shows an image management system 10 according to the present invention. In the following description, the image management system 10 is also referred to as an image manager 10. As shown in FIG. 1, the image management system 10 is connected to an ultrasound station 12 and to a Review/Archive station 14, for example a remote PACS (Picture Archive Communications System).

The image management system 10 provides the ultrasound station 12 with DICOM3 or DEFF compatibility, i.e. the capability to produce ultrasound image files in the DICOM3 or DEFF formats. The image manager 10 also allows the ultrasound station 12 to connect to the DICOM3 (or DEFF) compatible Review/Archive station 14 through a communication link or network 16, e.g. Ethernet. In another aspect, the image management system 10 allows the ultrasound station 12 to operate independently, i.e. as a stand-alone ultrasound console located in an examination room of a hospital with a local or "micro-PACS" capability as will be described in more detail below.

The ultrasound station 12 is a well-known device and comprises an ultrasound machine 18 and a display monitor 20. The ultrasound machine 18 uses ultrasonic waves for scanning a patient's body for medical diagnosis, e.g. prenatal care. The scan signals are translated into a 2-dimensional digital image which is then converted into an analog video output signal 22 on video-out port 23 for display on the monitor 20. The analog video output signal 22 includes an associated synchronization signal (not shown). Ultrasound machines known in the art typically produce a video output based on the RGB, NTSC or PAL standards as will be understood by those skilled in the art. The display monitor 20 has a video-in port 24 for receiving the analog video output signal 22.

Normally on a conventional ultrasound station 12, the video-out port 23 (and analog video output signal 22) is coupled directly to the video-in port 24 on the monitor 20 for the ultrasound station 12. According to the present invention, the analog video signal 22 is coupled to a video input port 26 on the image manager 10. In the image manager 10, the video input port 26 is connected to a switching stage 28 which is coupled to a frame buffer 30. The switching stage 28 has an output which forms a video output port 32. The video output port 32 is connected to the video-in port 24 on the ultrasound monitor 20. The frame buffer 30 provides one of the inputs (output video signal 25) to the switching stage 28 and the video-out port 23 from the ultrasound machine 18 provides another input, i.e. the analog video signal 22. The switching stage 28 controls the input source for the ultrasound monitor 20 by switching between the analog signal 22 or the output video signal 25 generated by the frame buffer 30. The default state for the switching stage 28 is loop-back mode, i.e. switching the analog video signal 22 directly to the video-in port 24 on the ultrasound monitor 20. Because the video signal 22 is looped directly back to the monitor 20, the image manager 10 minimizes artifacts in the images displayed on the monitor 20. Artifacts arise from analog-to-digital conversions, for example, due to quantization error.

As shown in FIG. 1, the analog video signal 22 is fed to the frame buffer 30 through a video buffer 34. Similarly, the output of the frame buffer 30 is connected to the switching stage 28 through another video buffer 36. The video buffers 34,36 buffer the respective video signals 22,23 and prevent loading.

The frame buffer 30 digitizes the analog video signal 22 from the ultrasound machine 28 and stores the digitized ultrasound images or frames in local memory. The digitized images can be recalled by the operator for display on the monitor 20. The local memory comprises resident memory (not shown) in the frame buffer 30 and a mass storage device and control logic to provide local image archive and database storage 38. Preferably, the frame buffer 30 comprises one of the IMAGSCAN™ family of products available from Imagraph of Boston, Mass. The frame buffer 30 preferably includes the capability to produce ultrasound image scan files in the DICOM3 and DEFF formats. The configuration of the frame buffer 30 is within the understanding of one skilled the art. According to the invention, the frame buffer 30 is synchronized with the digital sampling rate, i.e. pixel frequency, of the scan converter in the ultrasound machine 18.

As shown in FIG. 1, the image manager 10 includes a communications input/output port 40, for example, based on the industry-standard Ethernet protocol. The Ethernet standard is preferable for interfacing to PACS which utilize the same. The communications port 40 allows the image manager 10 and ultrasound station 12 to be connected to a Review/Archive station 14 and/or networked with an ultrasound management system, for example, comprising a number of ultrasound stations and one or more PACS.

Referring to FIG. 1, the image manager 10 includes other ports for connecting to a variety of peripherals. The image manager 10 has an optical drive input/output port 42 for connecting to a Magneto Optical Drive (MOD) 44. The interface 42 and MOD 44 provide the manager 10 with a substantial local archive and review or PACS (Picture Archive and Communications System) capability, thereby allowing the image manager 10 to be combined with an ultrasound 12 to form a stand-alone ultrasound management system suitable for smaller hospitals or medical clinics, i.e. storage and retrieval of ultrasound images in DICOM3 or DEFF format. The local archive and review capability of the image manager 10 may be further augmented by a CD ROM device 45. The image manager 10 includes a SCSI (Small Computer Systems Interface) port 46 which is suitable for use with a standard digital colour printer 48 and other SCSI compatible devices. The image manager 10 also includes an auxiliary video port 50. The auxiliary video port 50 comprises a video output 52 for a colour printer 54; a video output 56 for a video cassette recorder 58; a video output (black and white) 60 for a high definition multi-format camera 62; and a video output 64 for a black and white printer 66.

The image manager 10 also includes a video output 68 for a high resolution laser camera 70. The laser camera 70 is a known device which generates high definition slides that are viewed with the aid of a light box. The digital communications port 40 is used to control the operation of the laser camera 70 and the implementation of the port 40 will depend on the specifications of the particular laser camera 70 being utilized, for example, known laser cameras use an Ethernet interface.

The operation of the image manager 10 is controlled by a microcomputer. The image manager 10 includes a keypad 72 and a foot switch 74 for accepting commands from an ultrasound technician or hospital professional. For example, the operator will use the keypad 72 to retrieve captured images from the frame buffer 30 for display on the monitor 20.

Figure 2:
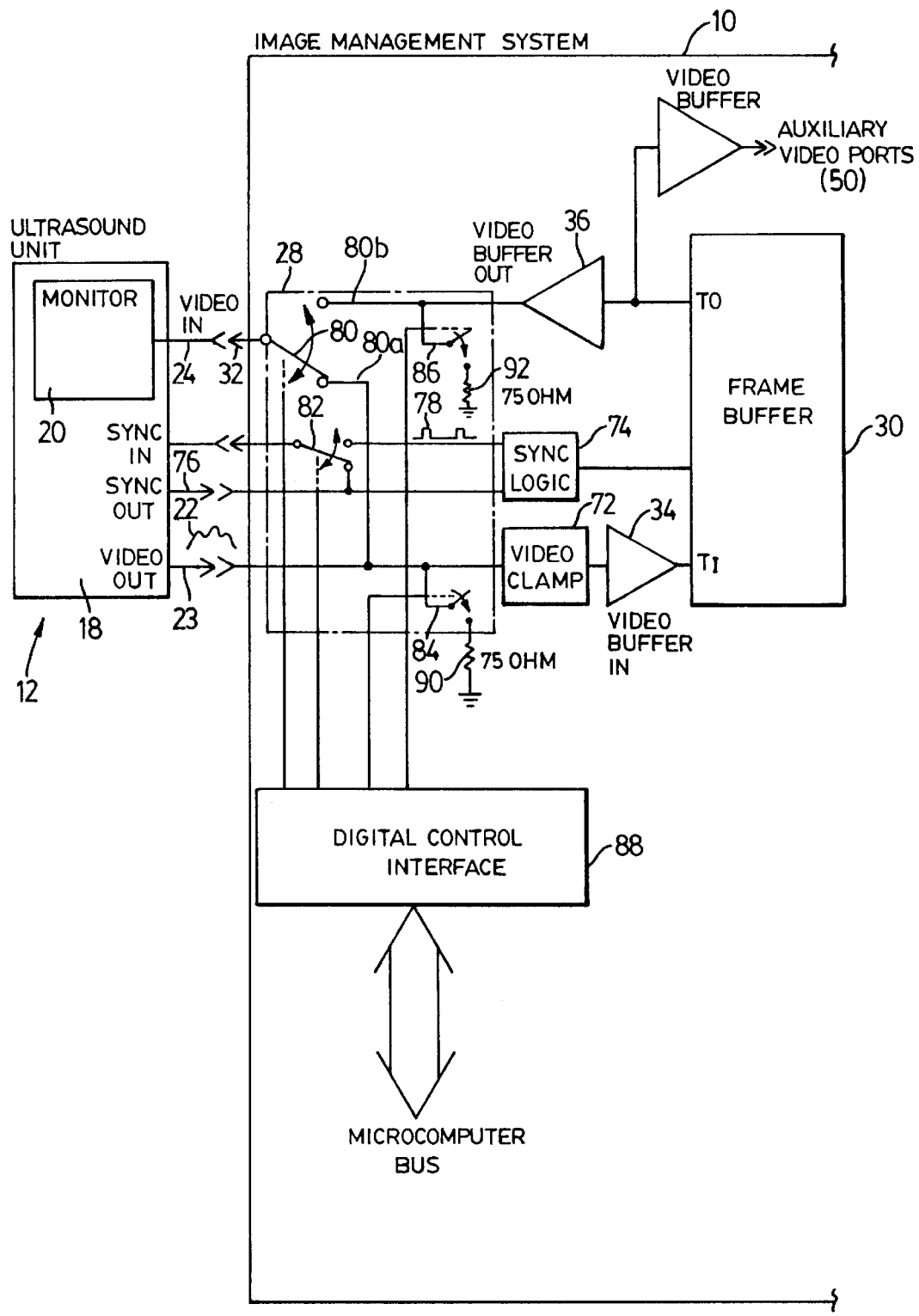
FIG. 2 is block diagram showing the switching control of the image management system of FIG. 1 in more detail.

Reference is next made to FIG. 2 which shows the switching stage 28 and video buffers 34,36 in more detail. The analog video signal 22 on the video-out port 23 is generated by the ultrasound machine 18 and comprise a RGB, NTSC or PAL standard. For convenience a single line is shown in FIG. 2. The image manager 10 includes a video clamp stage 72 which is coupled between the video buffer 34 and the video-out port 23 on the ultrasound machine 18. The function of the clamp stage 72 is to clamp or limit the voltage level of the analog signal 22 in order to protect the analog-to-digital converter on the input of the frame buffer 30. A video signal is typically 0.7 Volts. The clamp stage 72 clamps the input video signal 22 at approximately 1.2 Volts. The implementation of the clamp stage 72 is within the understanding of those skilled in the art and shown in more detail in FIG. 3.

Figure 3:
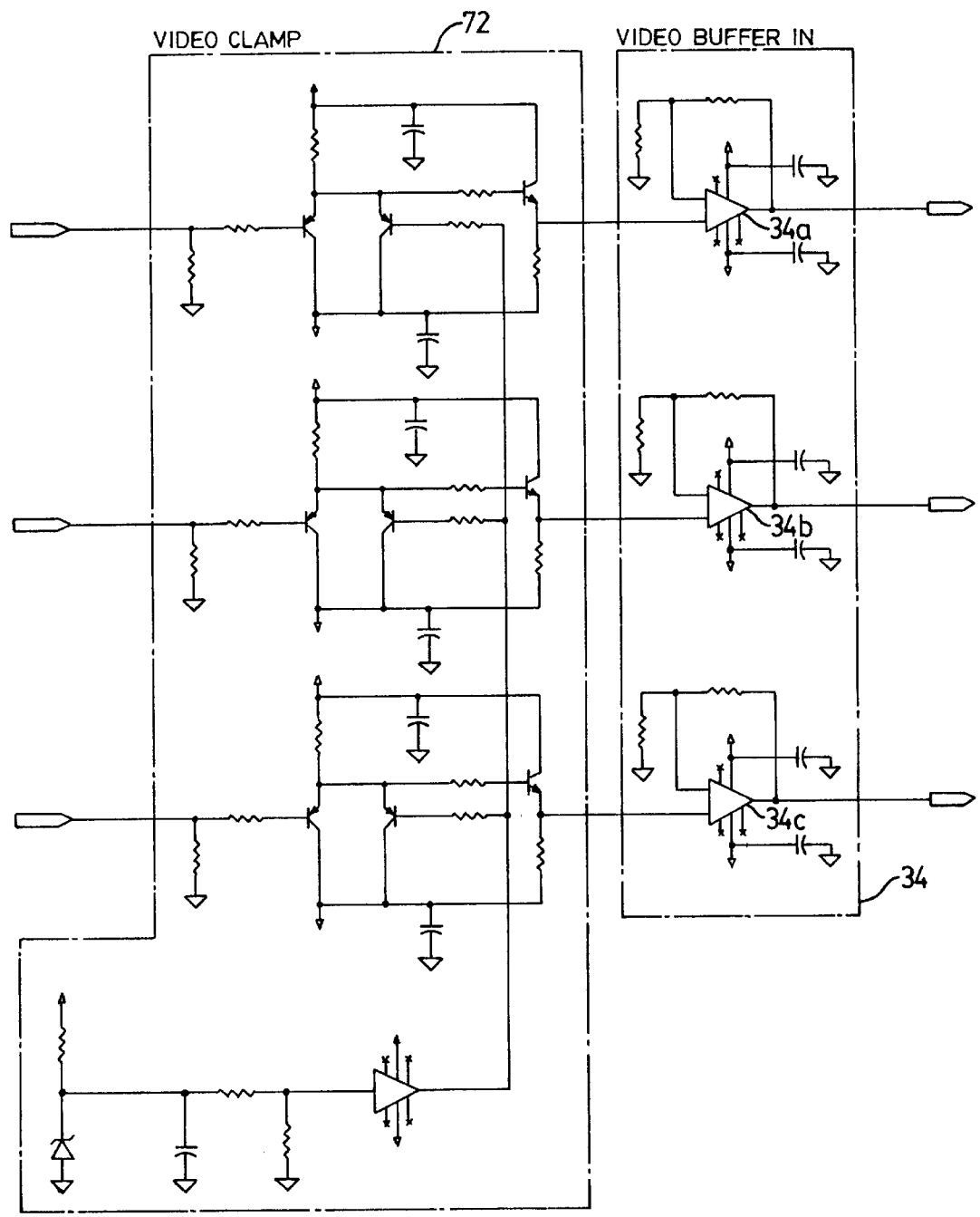
FIG. 3 is a schematic diagram of a video clamping and buffer stage for the image management system of FIG. 1.

The implementation of the video buffer stage 34 is also shown in FIG. 3. The video buffer stage 34 comprises video amplifiers 34a, 34b, 34c for R, G, B, signals comprising the analog video signal 22. The video amplifiers 34a, 34b, 34c are configured as unity gain buffers as will be within the understanding of those skilled in the art. A suitable component for the video buffers 34 is the LM6181N Video Amplifier available from National Semiconductor of Santa Clara, Calif.

Referring to FIG. 2, the image manager 10 includes a synchronization logic stage 74. The sync logic stage 74 is coupled to the sync output 76 on the ultrasound machine 18. The function of the sync logic stage 74 is to generate a synchronization signal 78 associated with the video output signal 25 produced by the frame buffer 30 so that the video signal 25 is compatible with the monitor 20. The sync logic stage 74 is configured to generate SYNC, Composite Sync (i.e. Horizontal Sync and Vertical Sync), and Sync-on-Green synchronization signals 78.

Figure 4:
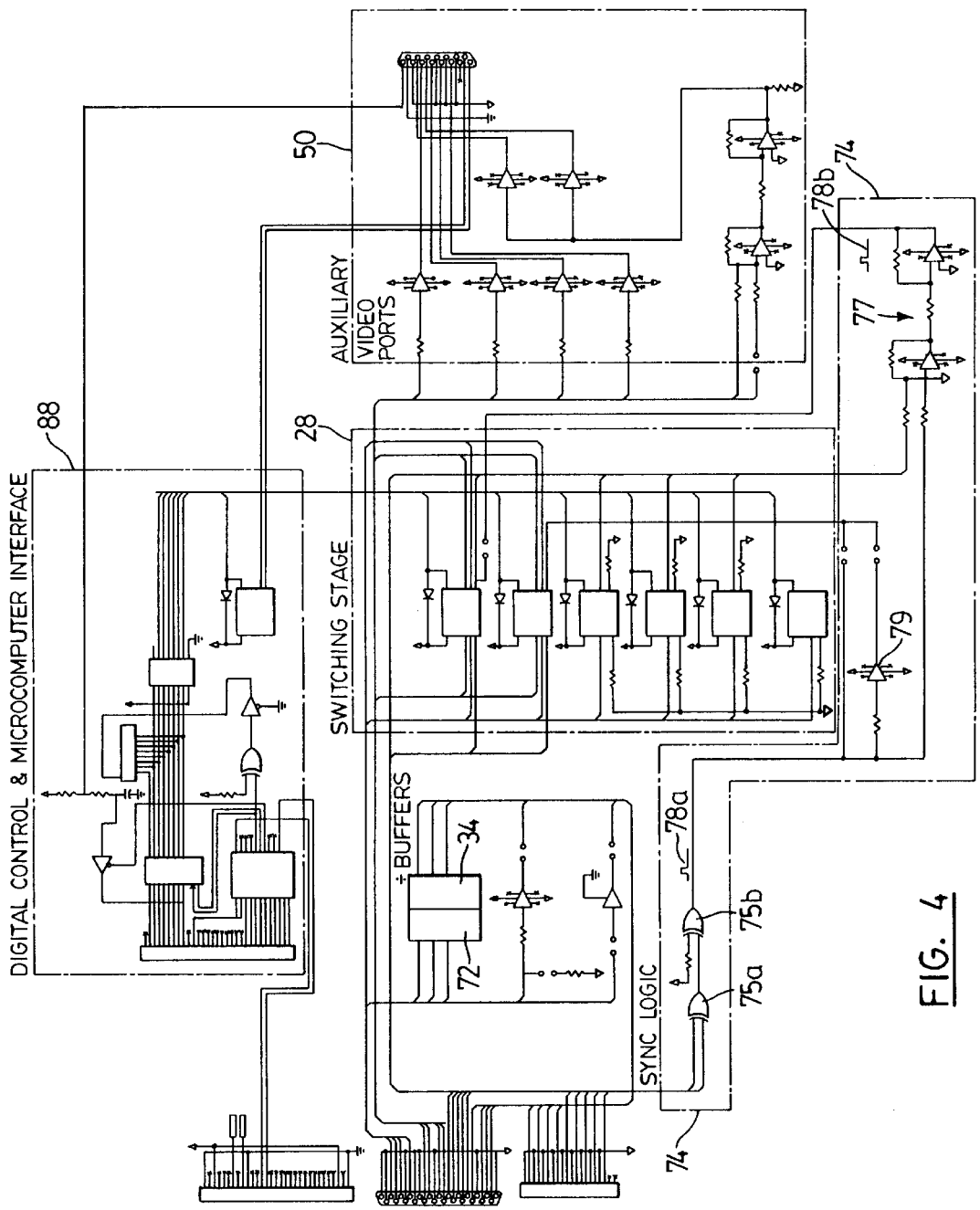
FIG. 4 is a schematic diagram of the switching control aspect of the image management system depicted in FIG. 1.

The sync logic stage 74 is shown in detail in FIG. 4. The sync logic stage 74 includes two EXOR logic gates 75a,75b which generate a composite sync signal 78a from the Horizontal Sync and Vertical Sync. The sync logic stage 78 also includes an analog adder circuit 77 to generate a sync-on-green signal 78b by adding the sync signal with the green video signal as will be understood by one skilled in the art. The sync logic 78 also includes a buffer 79 for buffering the sync signal 78. The appropriate sync signal 78,78a or 78b is connected to an input on the switching stage 28 using a jumper. The signal level, i.e. TTL or 75 Ohm terminated, for the sync signal 78 is also selected using a jumper. The switching stage 28 controls the source of the sync signal 78, i.e. from the sync out 76 on the ultrasound machine in loop-back mode or from the frame buffer 30 for the output video 25.

Referring to FIG. 2, the switching stage 28 comprises a switch 80 for switching the video signal source and a switch 82 for switching the sync signal source. The switching stage 28 includes a pair of switches 84,86 for impedance matching with the ultrasound monitor 20. The switches 80 to 86 are implemented using a bank of relays as shown in FIG. 4.

The switching stage 28 is coupled to and controlled by a microcomputer through a digital control interface 88. Preferably, the digital control interface 88 is coupled to the microcomputer bus as a memory-mapped peripheral. The implementation of the digital control interface 88 is within the understanding of one skilled in the art and shown in more detail in FIG. 4.

Referring to FIG. 2, the first switch 80 controls the video source to the ultrasound monitor 20. One input 80a of the switch 80 is connected to the video-out port 23 of the ultrasound 18 and receives the analog video signal 22. The other input 80b of the switch 80 is connected to the output of the frame buffer 30 through the video buffer 36 and receives the output video signal 25. The second switch 82 controls the sync signal source for the ultrasound monitor 20. One input 82a of the switch 82 is connected to the sync-out port 76 on the ultrasound machine 18 and receives the sync signal associated with the analog video signal 22. The other input 82b of the switch 82 is connected to the output of the sync logic stage 74 and receives the sync signal 78 associated with the output video signal 25. In response to user commands (e.g. via the keypad), the microcomputer through the digital control interface 88 activates the switches 80,82 to change the video/sync source for the monitor 20. The default state for the switches 80,82 is loop-back mode, i.e. the analog video signal 22 and sync signal is looped directly back to the video-in port 24 and sync-in port on the ultrasound monitor 20. This ensures that should the image manager 10 or network go down, the ultrasound station 12 can maintain normal operation.

The third and fourth switches 84,86 provide impedance matching for the ultrasound monitor 20. Because the ultrasound images are used for medical diagnosis, it is critical that the integrity of the analog video signal 22 and video output signal 25 be maintained. Impedance matching is important for maintaining the signal integrity and minimizing noise in the loop-back mode. As shown in FIG. 2, the switch 84 is coupled to a resistor 90. The resistance value for the resistor 90 depends on the specifications of the monitor 20. The switch 86 is also coupled to a resistor 92. In the loop-back mode, the switch 84 couples the resistor 90 to the video-in port 24 so that the monitor 20 sees a 75 Ohm impedance. The other switch 86 couples the output of the video buffer 36 to ground through the resistor 92 in order to minimize noise which may be coupled by the video-in port 24 and corrupt the video signal 22 being switched to the ultrasound monitor 20.

In operation, a medical technician uses the ultrasound station 12 to scan a patient, for example, an expectant mother. During the scan, the ultrasound 12 generates the video output signal 22, and in loop-back mode the video output 22 is displayed on the monitor 20. The video output signal 22 is also fed to the frame buffer 30 through the video buffer 34 and digitized in the background by the image manager 10. During the scanning session, the medical technician uses the keypad 72 to switch between the display of the image produced by the ultrasound station 12 or the digital images stored in the frame buffer 30. Once the session is completed, the medical technician may direct the digital images from the image manager 10 to any one of the peripherals, e.g. the laser camera 70 or for long-term storage and retrieval to the MOD 44 or archive station 14 in a networked system.

It is a feature of the image manager 10 that in loop-back mode, the analog video output signal 22 is routed directly (i.e. without passing through the frame buffer 30) to the video-in port 24 on the monitor 20 in order to maintain the integrity of the ultrasound image. This is important because the interpretation of ultrasound images depends largely on an operator's ability to distinguish subtle textures and features in the image being displayed on the ultrasound monitor 20 and changes introduced to the image may affect the operator's interpretation.

The present invention may be embodied in other specific forms without departing from the spirit or essential characteristics thereof. While the subject invention has been described with reference to an ultrasound system which generates an analog video output, certain adaptations and modifications of the invention will be obvious to those skilled in the art, for example, utilizing an ultrasound machine which produces a digital output. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. An image management system for use in conjunction with an ultrasound machine having a scan converter for converting ultrasonic scan data into a video output signal and a monitor having an input for receiving a video input signal for display, said image management system comprising;
   (a) an input port coupled to said ultrasound machine for receiving said video output signal;
   (b) a switch for routing a signal for display on said monitor, said switch having a switch output coupled to the input of said monitor and a first switch input coupled to said input port for receiving said video output signal from the ultrasound machine and a second switch input for receiving another video output signal, and wherein said first input comprises a loop-back oath for directly coupling said video output signal from the scan converter for display on said monitor; and
   (c) switching control means coupled to said switch for selectively switching said video output signal and said other video output signal to said switch output for displaying said selected video signal on said monitor.

2. The system as claimed in claim 1, further including a frame buffer having an input for receiving said video output signal and having image processing means for processing said video output signal and generating a video output signal at an output coupled to said second switch input.

3. The system as claimed in claim 2, wherein said switching stage includes a video clamp for clamping said video output signal, said video clamp being coupled between said input port and the input to said frame buffer.

4. The system as claimed in claim 1, wherein said switching means switches said video output signal from the ultrasound machine to said switch output in a power-down condition.

5. The system as claimed in claim 2, wherein said switching means switches said video output signal from the ultrasound machine to said switch output in a power-down condition.

6. The system as claimed in claim 3, wherein said switching stage includes a video buffer coupled to said input port for buffering said video output signal.

7. The system as claimed in claim 3, wherein said switching stage includes impedance matching means for terminating said monitor.

8. An image management system for use in conjunction with an ultrasound machine having a scan converter for converting ultrasonic scan data into a video output signal and a monitor having an input for receiving a video input signal for display, said image management system comprising:
   (a) an input port coupled to said ultrasound machine for receiving said video output signal;
   (b) a switch for routing a signal for display on said monitor, said switch having a switch output coupled to the input of said monitor and a first switch input coupled to said input port for receiving said video output signal from the ultrasound machine and a second switch input for receiving a second video output signal, and wherein said first input comprises a loop-back path for directly coupling said video output signal from the scan converter for display on said monitor;
   (c) switching control means coupled to said switch for selectively switching said video output signal and said other video output signal to said switch output for displaying said selected video signal on said monitor,
   (d) a frame buffer having an input for receiving said video output signal and having image processing means for processing said video output signal and generating video output signal at an output coupled to said second switch input;
   (e) said image processing means having means for generating digital image files corresponding to said video output signal;
   (f) storage means for storing and retrieving said digital image files; and
   (g) a communication port for coupling the image management system to a communication network and means for transferring digital image files over said communication network.

9. The system as claimed in claim 8, wherein said switching stage includes impedance matching means for terminating said monitor.

10. The system as claimed in claim 9, wherein said switching stage includes a video clamp for clamping said video output signal, said video clamp being coupled between said input port and the input to said frame buffer.

11. The system as claimed in claim 10, wherein said switching stage includes a video buffer coupled to said input port for buffering said video output signal.

12. The system as claimed in claim 8, wherein said storage means comprise an optical disk drive.

13. The system as claimed in claim 8, wherein said digital image files comprise DICOM3 compatible data.

14. The system as claimed in claim 12, wherein said digital image files comprise DICOM3 compatible data.

15. The system as claimed in claim 8, wherein said digital image files comprise DEFF compatible data.

16. The system as claimed in claim 12, wherein said digital image files comprise DEFF compatible data.

* * * * *